United States Patent Office

3,211,754
Patented Oct. 12, 1965

1

3,211,754
PRODUCTION OF 1-BROMO-2-(BROMOACETYL)-
ANTHRAQUINONE
Erwin Klingsberg, Mountainside, N.J., assignor to American Cyanamid Company, New York, N.Y., a corporation of Maine
No Drawing. Filed Mar. 2, 1962, Ser. No. 176,909
1 Claim. (Cl. 260—376)

This invention relates to 1- and 2-substituted anthraquinones which are useful as intermediates for vat dyes, and to processes for producing these anthraquinones; more particularly it pertains to certain compounds in which the substituent in the 1-position is a nitro, amino, bromo or ido group and in which the substituent in the 2-position is an α-acetoxyethyl, acetyl or bromo-acetyl group.

The anthraquinone nucleus is a highly stable tricarbocyclic nucleus which is useful in vat dye-stuffs. 2-ethyl-1-nitroanthraquinone and certain of its derivatives are disclosed in such patents as Wilke, 1,830,153, "Ortho-Aminoaldehydes and Ortho-Aminoketones of the Anthraquinone Series and Process of Preparing Them," November 3, 1961. The prior art teaches the production of cinnolines from 2-acetyl-1-aminoanthraquinone in such patents as Ebel, 2,663,708, "4-Hydroxy-7,8-Phthaloyl-Cinnolines and Process of Preparing Same," December 22, 1953. The treatment with diazotizing agents gives the cinnolines which are very stable compounds.

It has now been found that 2-ethyl-1-nitroanthraquinone can be converted by two different processes to 2-acetyl-1-nitroanthraquinone which is reduced to 2-acetyl-1-aminoanthraquinone, and this compound in turn can be brominated or iodinated to yield compounds which are useful as dyestuff intermediates, yielding yellow vat dyes.

The reactions involved are shown in the following chart, in which the Roman numerals are used to designate compounds and Arabic to identify the examples following:

2

2-ethyl-1-nitroanthraquinone is brominated with bromine in an inert solvent to yield 2-(α-bromoethyl)-1-nitroanthraquinone, which in turn is treated with silver acetate in acetic acid to replace the bromine with an acetoxy substituent. The resulting compound is oxidized with chromium trioxide to give 2-acetyl-1-nitroanthraquinone, for example, in a mixture of acetic and sulfuric acids at room temperature.

Alternatively, the 2-ethyl-1-nitroanthraquinone is directly oxidized by chromic acid in acetic and sulfuric acids to yield the 2-acetyl-1-nitroanthraquinone.

The prior art has taught the oxidation of the 2-ethyl-1-nitroanthraquinone to 2-carboxy-1-nitroanthraquinone, so that it is surprising to find that the oxidation in a mixture of acetic and sulfuric acids can be controlled to give the acetyl derivative. About 1.3 to 1.6 mols of chromic acid acid near room temperature, about 20° C. to 30° C., gives the best results. The nitro group is readily reduced to an amino group in aqueous ammonia by a hydrosulfite such as sodium hydrosulfite.

The 2-acetyl-1-aminoanthraquinone is diazotized in sulfuric acid and then reacted with a solution of a bromide or iodide to replace the diazonium group with halogen. An alkali metal iodide or cuprous bromide, preferably in the presence of an alkali metal bromide gives good results.

Either the 1-bromo or 1-iodo compound is converted to 1-bromo-2-(bromoacetyl)-anthraquinone by refluxing in acetic acid with bromine. It is particularly surprising that the bromine replaces the iodine in the 1 position.

The 1-bromo- or 1-iodo-2-acetyl-, or 1-bromo-2-(bromoacetyl)-anthraquinones, when reacted with Bz-1-aminobenzanthrone, give yellow vat dyes for cotton.

The present invention is further detailed in the following examples in which the temperatures are centigrade and the parts are by weight, except where otherwise specified.

The scope of the present invention is illustrated by the foregoing discussion and the examples, but is defined in the appended claims.

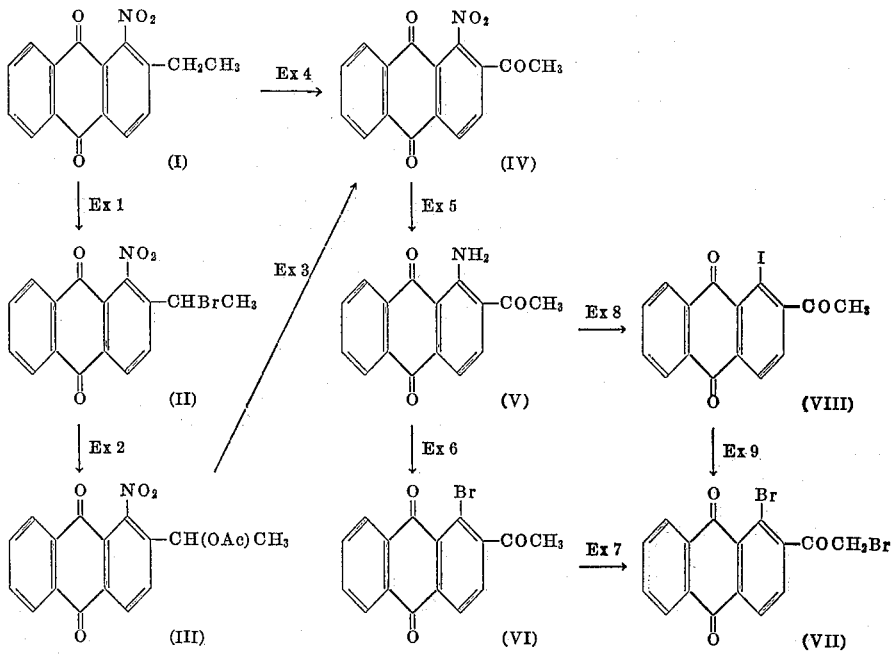

Example 1.—2-(α-bromoethyl)-1-nitroanthraquinone (II)

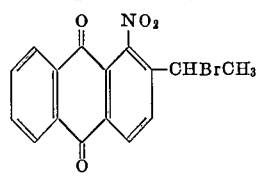

A solution of 8.0 parts of 2-ethyl-1-nitroanthraquinone (I) in 10 parts by volume of nitrobenzene is stirred (in an oil bath) at 150–160° C. while a solution of 2.1 parts by volume of bromine in 5 parts by volume of nitrobenzene is added gradually over a 45-minute period. The reaction is stirred at the same temperature for an additional 1¼ hours. The 2-(α-bromoethyl)-1-nitroanthraquinone (II) is filtered from the solvent and washed with nitrobenzene. It may be recrystallized from acetic acid.

The yield is 81% of theoretical of yellow solid, M.P. 227–9° C. Crystallization from acetic acid raises the M.P. to 229–230° C.

Example 2.—2-(α-acetoxyethyl)-1-nitroanthraquinone (III)

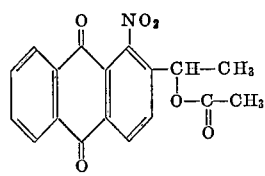

A mixture of 2.0 parts of 2-(α-bromoethyl)-1-nitroanthraquinone (II) from Example 1 and 0.93 part of silver acetate in 50 parts by volume of acetic acid is refluxed for one hour, cooled and filtered. The 2-(α-acetoxyethyl)-1-nitroanthraquinone (III) obtained is recrystallized from 25 parts by volume of xylene.

The yield of the product as recrystallized is 53% of theoretical of a white product, M.P. 237–238° C. A second recrystallization from xylene raises the M.P. to 241–242° C.

Example 3.—2-acetyl-1-nitroanthraquinone (IV)

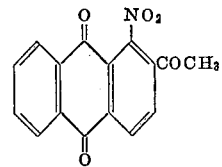

A mixture of 4.8 parts of 2-(α-acectoxyethyl)-1-nitroanthraquinone (III), 2.64 parts of chromium trioxide, 100 parts by volume of acetic acid, and 12 parts by volume of sulfuric acid is stirred for 64 hours at room temperature. The 2-acetyl-1-nitroanthraquinone (IV) thus produced is filtered from the solvent, washed with alcohol and crystallized from 300 parts by volume of acetic acid.

Example 4.—2-acetyl-1-nitroanthraquinone (IV)

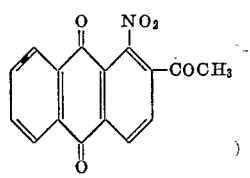

A mixture of 4.6 parts of 2-ethyl-1-nitroanthraquinone (I), (16.4 millimoles) 2.64 parts (26.4 millimoles) of chromium trioxide, 100 parts by volume of acetic acid and 12 parts by volume of sulfuric acid is stirred for sixty-four hours at room temperature so that the reaction is complete. The 2-acetyl-1-nitroanthraquinone (IV) is filtered from the solvent, washed with alcohol, and crystallized from 300 parts by volume of acetic acid.

The yield is 58% of theoretical of pale yellow product, M.P. 264–7° C. Crystallization from xylene or acetic acid raises the M.P. to 266–7° C.

Example 5.—2-acetyl-1-aminoanthraquinone

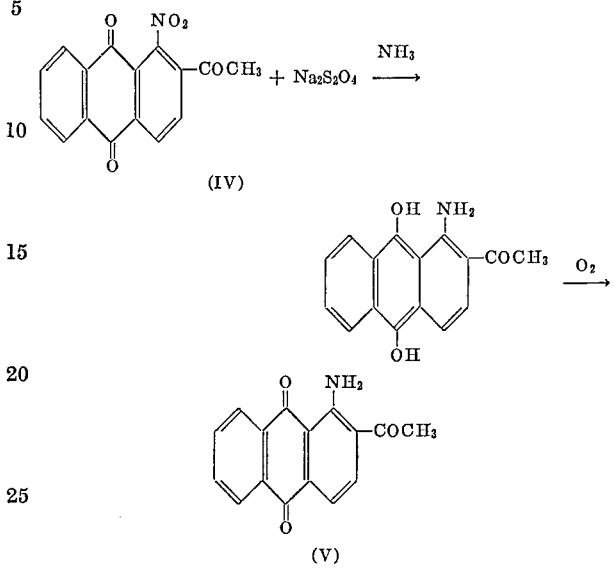

To 100 parts of water is added 0.5 part of 2-acetyl-1-nitroanthraquinone (IV), 20 parts by volume of concentrated ammonia solution and 2.3 parts of sodium hydrosulfite. The system is closed and warmed at 75° C. until the reaction is complete. The reaction mixture is then aerated to convert the product to its quinone form. The 2-acetyl-1-aminoanthraquinone (V) is filtered out, washed with water, dried and recrystallized from xylene.

Example 6.—2-acetyl-1-bromoanthraquinone (VI)

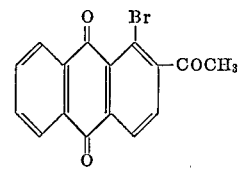

Five parts of 2-acetyl-1-aminoanthraquinone (V) is diazotized in 30 parts of concentrated sulfuric acid, which has been cooled to 6° C., and carefully diluted with 20 parts by weight of ice and water, by adding, while holding below 10° C., a mixture of 1.65 parts sodium nitrite in 10 parts by volume of concentrated sulfuric acid, then drowned over ice and filtered. The filtrate containing the diazonium solution is added to a boiling suspenison of 3.2 parts of cuprous bromide, 100 parts of sodium bromide and 100 parts of water. It is then stirred at the boil until the reaction is complete. It is then cooled, filtered and washed. The 2-acetyl-1-bromoanthraquinone (VI) is recrystallized from mixed amyl alcohols.

The yield is 58% of the theoretical of pale brown product, M.P. 181–183° C. Further recrystallization raises the M.P. to 185–187° C.

Example 7.—1-bromo-2-(bromoacetyl)anthraquinone (VII)

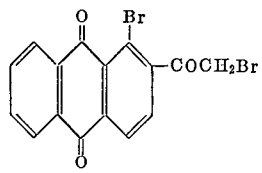

A solution of 0.19 part of bromine in 2 parts by volume of acetic acid is added gradually to a refluxing solution of 1.0 part of 2-acetyl-1-bromoanthraquinone (VI), prepared as in Example 6. The solution is heated at reflux for 1 hour; then cooled and the product filtered from the solvent. The 1-bromo-2-(bromoacetyl)-anthraquinone (VII) may be recrystallized from acetic acid or methylcyclohexane.

A yield of 74% of theoretical is obtained of yellow product, M.P. 158–163° C. Repeated crystallization from acetic acid or methylcyclohexane raises the M.P. to 171–3° C.

*Example 8.—2-acetyl-1-iodoanthraquinone (VIII)*

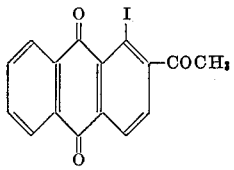

A solution of 5.0 parts of 2-acetyl-1-aminoanthraquinone (V) in 30 parts by volume of concentrated sulfuric acid is cooled to 6° C., carefully diluted in the cold with 20 parts by weight of ice and water, and then diazotized below 10° C. by the addition of a solution or suspension of 1.65 parts of sodium nitrite in 10 parts by volume of concentrated sulfuric acid. The solution is stirred at 0–5° C. until diazotization is complete. The solution is then drowned over ice, and filtered cold. The filtrate is treated with 30 parts of potassium iodide and stirred until replacement of the diazonium group is complete. The 2-acetyl-1-iodoanthraquinone (VIII) thus obtained is filtered from the solvent and dried. A yield of 85% of the theoretical is obtained.

The product is a brown solid, M.P. 174–179° C. Repeated crystallization from diluted acetic acid, alternating with methylcyclohexane raises the M.P. to 189–190° C.

*Example 9.—Bromination of 2-acetyl-1-iodoantraquinone*

A solution of 5 parts of 2-acetyl-1-iodoanthraquinone (VIII) in 50 parts by volume of boiling acetic acid is treated with a solution of 4.2 parts of bromine in 20 parts by volume of acetic acid. After completion of the reaction, the product is cooled and filtered from the solvent. 1-bromo-2-bromoacetylanthraquinone (VII) is obtained.

*Example 10.—Yellow dye from 2-acetyl-1-bromoanthraquinone (VI)*

A mixture of 5 parts of Bz-1-aminobenzanthrone, 7 parts of 2-acetyl-1-bromoanthraquinone (VI), 0.5 part cuprous chloride, 5 parts of anhydrous sodium acetate, and 100 parts of napthalene is refluxed 5 hours, cooled, diluted with xylene and filtered. The brown product gives yellow vat dyeings on cotton.

*Example 11.—Yellow dye from 1-bromo-2-(bromoacetyl)-anthraquinone (VII)*

A mixture of 5 parts of Bz-1-aminobenzanthrone, 7 parts of 1-bromo-2-(bromoacetyl)-anthraquinone (VII), 0.5 part cuprous chloride, 5 parts of anhydrous sodium acetate and 100 parts of naphthalene is refluxed for 5 hours, diluted with kerosene and filtered. The brown product thus obtained gives yellow vat dyeings on cotton.

A similar anthrimide vat dye is obtained when 2-acetyl-1-iodoanthraquinone (VIII) is used as the starting material in the procedure of the above paragraph. This dye, too, gives yellow dyeings on cotton.

I claim:

The process of preparing 1-bromo-2-(bromoacetyl)-anthraquinone comprising heating at about reflux 2-acetyl-1-iodoanthraquinone with bromine in acetic acid.

References Cited by the Examiner

UNITED STATES PATENTS

| 1,830,153 | 11/31 | Wilke | 260—376 |
| 1,833,272 | 11/31 | Wilke | 260—376 |
| 1,987,747 | 1/35 | Nawiasky et al. | 260—376 |

FOREIGN PATENTS

| 56,600 | 7/11 | Switzerland. |
| 7,631 | 10/10 | Great Britain. |
| 1,127,911 | 4/62 | Germany. |

OTHER REFERENCES

Houben-Weyl, "Methoden der Organischen Chemie," vol. 5/4, pp. 354–360 (1952).

Migrdichian, "Organic Synthesis," vol. II (1960), pp. 1354, 1477–1478, 1501 and 1559–1560.

LORRAINE A. WEINBERGER, *Primary Examiner.*

LEON ZITVER, *Examiner.*